(12) United States Patent
Park et al.

(10) Patent No.: US 6,173,208 B1
(45) Date of Patent: Jan. 9, 2001

(54) METHOD FOR GENERATING CONTROL CODES FOR USE IN A PROCESS CONTROL SYSTEM

(75) Inventors: Jung Min Park, Koyang; Young Jo Cho, Seongnam; Woo Jung Huh; Eung Seok Kim, both of Suwon, all of (KR)

(73) Assignee: Korea Institute of Science and Technology, Seoul (KR)

(*) Notice: Under 35 U.S.C. 154(b), the term of this patent shall be extended for 0 days.

(21) Appl. No.: 09/058,966

(22) Filed: Apr. 13, 1998

(30) Foreign Application Priority Data

May 29, 1997 (KR) .................................. 97-21703

(51) Int. Cl.⁷ ............................ G05B 15/00; G05B 11/01
(52) U.S. Cl. ................................................ 700/83; 700/18
(58) Field of Search ................... 700/89, 86, 87, 700/83, 17, 18, 31, 51

(56) References Cited

U.S. PATENT DOCUMENTS 4,901,221 * 2/1990 Kodosky ............................... 364/200
5,301,336 * 4/1994 Kodosky ............................... 395/800
5,610,828 * 3/1997 Kodosky ............................... 364/489
5,732,277 * 3/1998 Kodosky ............................... 395/800

* cited by examiner

Primary Examiner—William Grant
Assistant Examiner—Ronald D Hartman, Jr.
(74) Attorney, Agent, or Firm—Oblon, Spivak, McClelland, Maier & Neustadt, P.C.

(57) ABSTRACT

Structured control codes which control a subject system are generated in a process control system having a user interface of a function block diagram editor including basic function block menus which represent a plurality of predetermined basic function blocks. The structured control codes are generated by the steps of: providing input/output data of the subject system in the form of database; retrieving the input/output data of the subject system; providing the input/output data as an input/output block menu on the user interface of the function block diagram editor; building a control algorithm by using the input/output block menus and the basic function block menus on the user interface; and converting the control algorithm to structured control codes.

5 Claims, 13 Drawing Sheets

METHOD FOR GENERATING CONTROL CODES FOR USE IN A PROCESS CONTROL SYSTEM

BACKGROUND OF THE INVENTION

1. Field of the Invention

The present invention relates to a method for generating a process control algorithm in a process control system, and more particularly, to a method for generating a control algorithm on a graphical user interface of a function block diagram editor and automatically converting the created control algorithm to executable structured control codes.

2. Description of the Prior Art

In the field of massive process control, there have been continuous efforts to establish an automatic control system by using a digital computer. For example, a crane control system controls three types of transmissions (that is, a gantry, a trolley and a hoist) and various driving devices (for example, a rope tensioner and a spreader manipulator) in response to operation commands of an operator from an input device. To perform process control by using such a multifunctional controller, a user program is needed which is a control algorithm adapted to an object system to be controlled. High level program languages such as $C^{++}$ and PASCAL can be used to build such control algorithms. However, they are too general and complex for a field user. Moreover, precise knowledge of the details of related hardware is required to implement necessary hardware functions.

To solve these problems, a programmable logic controller has been used thus far, wherein a ladder diagram is used as a graphical control language. However, the programmable logic controller is known to be unsuitable as a process controller which performs not only sequential control functions according to a process flow but also loop control functions, such as rope tension control and operation speed setting of driving devices which should be done in a timely manner. Moreover, the complexity of the ladder diagram increases dramatically as the size of the system increases, thereby rendering it almost impossible to correct any errors encountered in the course of creating the control algorithm.

SUMMARY OF THE INVENTION

It is an object of the present invention to provide a method for generating a process control algorithm by using a function block diagram, each function block representing a basic control element, whereby process control algorithms for various processes can be easily provided.

It is another object of the present invention to provide a method for automatically converting the process control algorithm to structured control codes which can be executed in a control system.

In accordance with the present invention, there is provided a method for use in a process control system for generating structured control codes which control a subject system, said process control system having a user interface of a function block diagram editor including basic function block menus which represent a plurality of predetermined basic function blocks, comprising the steps of:

providing input/output data of the subject system in the form of a database;

retrieving the input/output data of the subject system;

providing the input/output data as an input/output block menu on the user interface of the function block diagram editor;

building a control algorithm in block diagram form by using the input/output block menus and the basic function block menus on the user interface; and converting the control algorithm to structured control codes.

BRIEF DESCRIPTION OF THE DRAWINGS

The above and other objects and features of the present invention will become apparent from the following descriptions of the preferred embodiments taken in conjunction with the accompanying drawings, in which:

FIGS. 7b to 7d show a directed graph corresponding to the function block diagram as shown in FIG. 7a;

FIG. 9a shows a block diagram list of a process control algorithm represented as a function block diagram as shown in FIG. 7a;

DETAILED DESCRIPTION OF THE INVENTION

Figure 1:
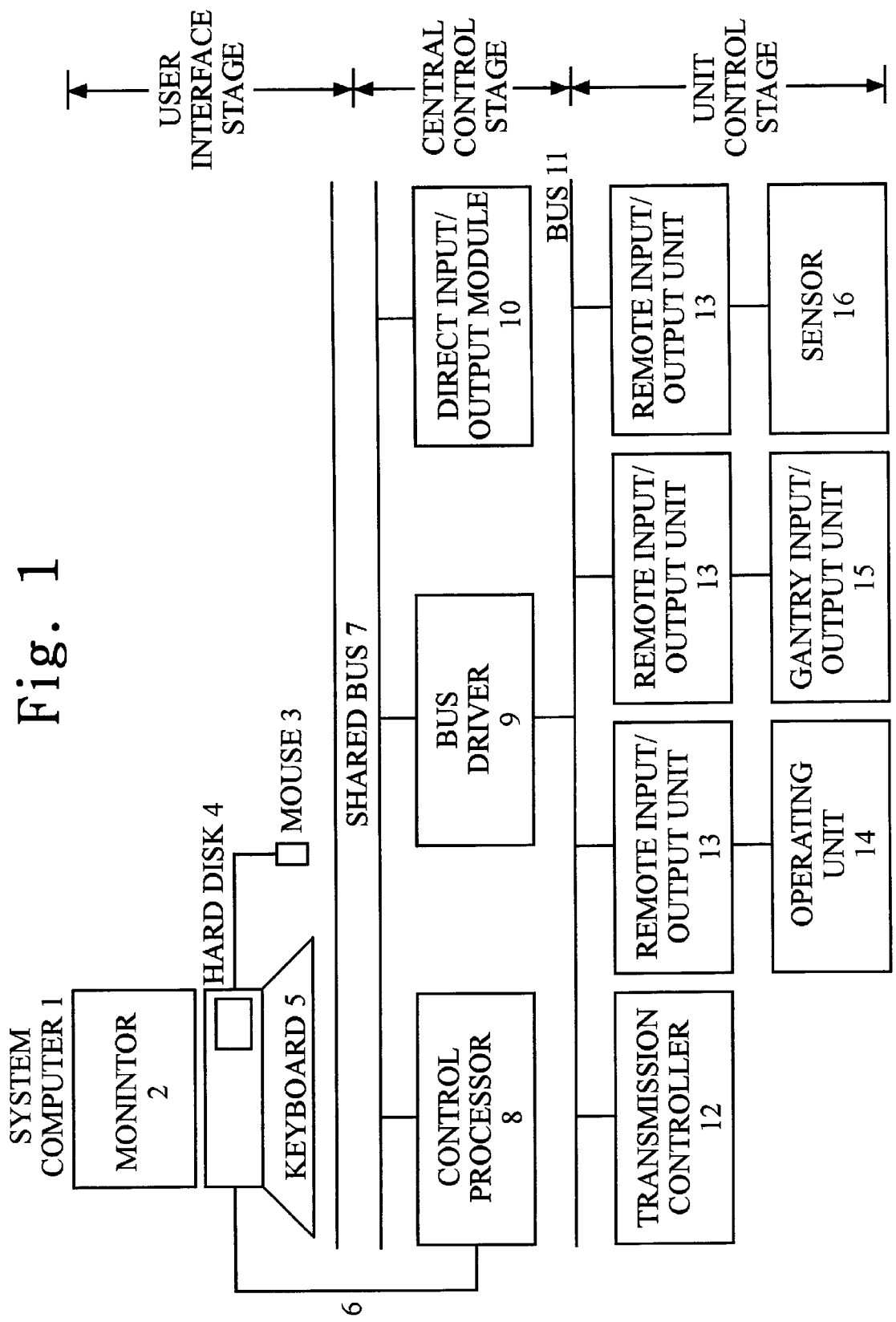
FIG. 1 shows a block diagram of a process control system in accordance with the present invention.

Referring to FIG. 1, there is shown a schematic block diagram of a process automation system of the present invention. A system computer 1, which is preferably compatible with an IBM personal computer, uses a mouse 3 and a keyboard 5 as its input devices, and a monitor 2 as its output device. A control processor 8, in which a real time operating system is running, shares data by communicating via network line 6 with the system computer 1 by using a TCP/IP protocol such as ethernet. A central control stage includes a control processor 8, a bus driver 9, a direct input/output module 10. A unit control stage includes remote input/output units 13, an operating unit 14, a gantry input/output unit 15, and a sensor 16 which form a remote input/output part, and a transmission controller 12. The central and unit control stages are connected through a bus 11, e.g., profibus, so that the two stages can communicate on a real time basis to share data. The control processor 8, the bus driver 9, and the direct input/output module 10 are connected to a shared bus 7 such as a VME bus. The shared bus 7 is used to transfer data in the central control stage.

In the present invention, basic function blocks are defined and used to represent basic control elements which form a control algorithm. The function blocks are classified according to their functions into various function block groups such as an arithmetic, trigonometric, combination, comparison, bit-shift, selection, variable type conversion and miscellaneous function block groups.

In the present process automation system, a user function block is defined as a combination of more than two basic function blocks which represent a frequently used set of control elements. The user function block may be edited by using a textual editor in the system computer 1 and then stored in a hard disk 4. The user function block may be re-edited and modified properly to form part of the control algorithm. These user function blocks are generated dynamically while editing function block diagram and maintained in the form of a library. Therefore, each use of a user function block as a part of the control algorithm does not necessitate accessing the hard disk 4, since the user function blocks can be recalled dynamically. The user function blocks can be used by different control algorithms.

Figure 5:
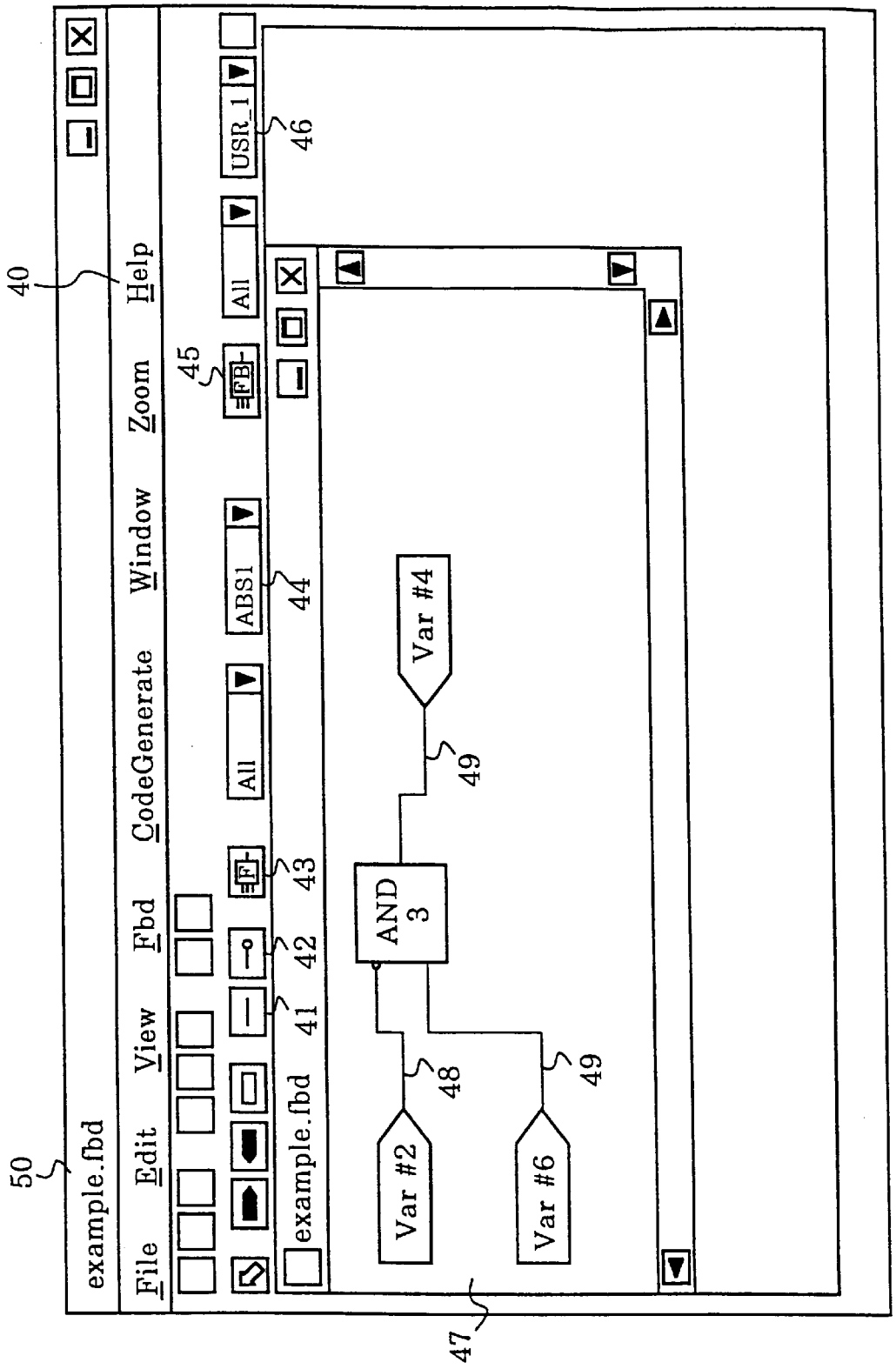
FIG. 5 shows a graphical user interface of a function block diagram editor of the present invention.

A method for generating a control algorithm by using function blocks will be explained in detail with reference to FIGS. 2 and 5. In the present invention, input/output data, e.g., the number and types of input/outputs, of the system to be controlled is managed in the form of a database so that knowledge on the characteristic of the input/output of the subject system is not separately needed in constructing the control algorithm. The database is preferably stored in the hard disk 4.

Figure 2:
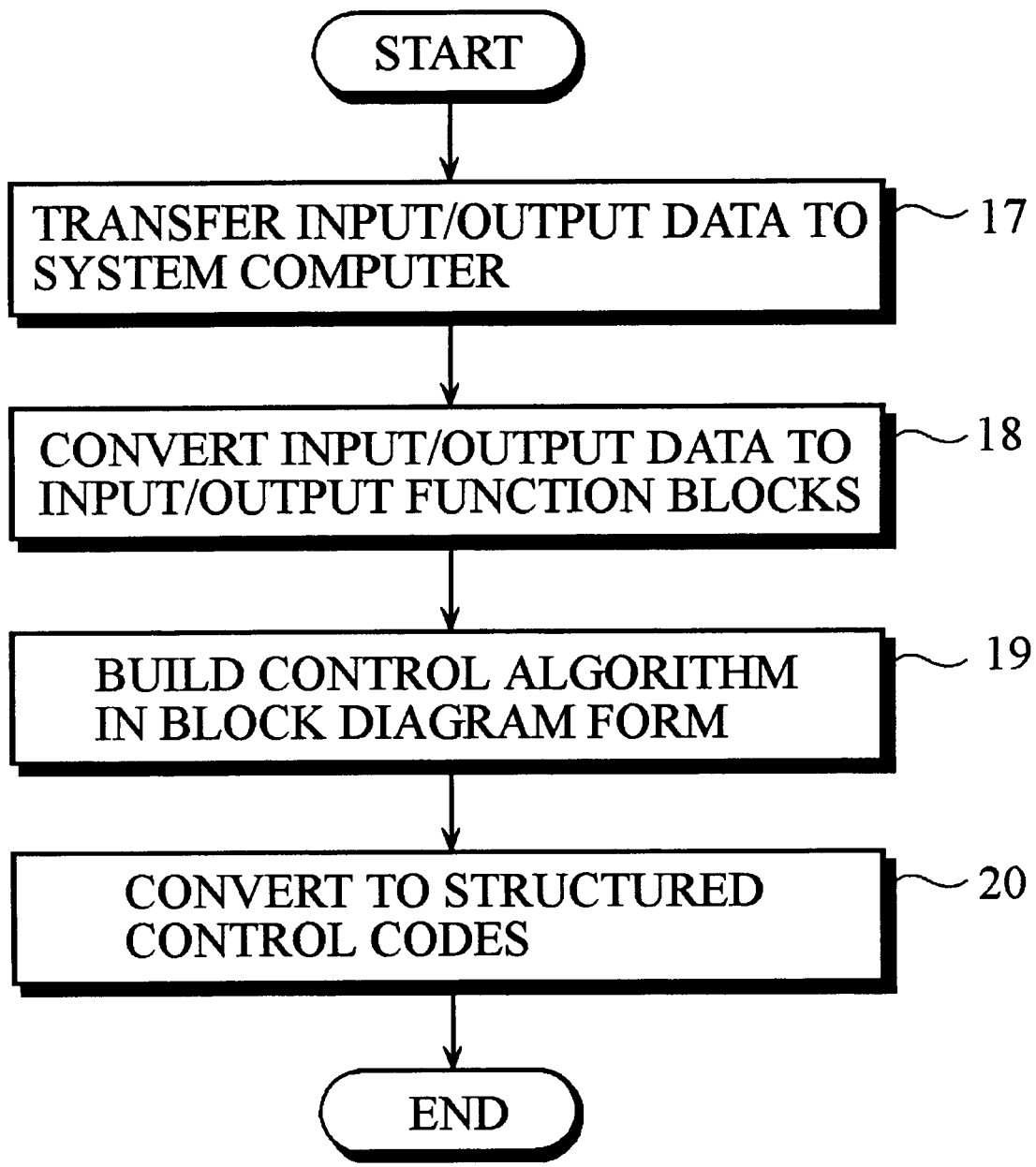
FIG. 2 shows a flow chart illustrating steps for generating structured control codes in accordance with the present invention.

Referring to FIG. 2, at step 17, upon request from the system computer 1, input/output data stored in the hard disk 4 is transferred to the system computer 1 in the form of a database, to be used by the function block diagram editor. At step 18, the input/output data transferred to the system computer 1 is converted to a list of input/output function blocks. The input/output function blocks are used to form part of the control algorithm, when a user builds the control algorithm on the user interface of the system computer 1 by using the function block diagram editor. All input/output data associated with the system to be controlled are loaded before making the control algorithm, which guarantees that reference is not made to an input device which is not connected to the system and that the result is not misdirected to a wrong output device. Although input/output data is originally transferred in the form of structured data including, e.g., names and type, the input/output data, once converted to input/output function blocks, can be handled in the same manner as for other function blocks such as arithmetic function blocks. The transfer of input/output data at step 17 and the conversion into input/output function blocks at step 18 may be performed by clicking a "open" or "new" menu (not shown) which is included in the pull down menu of the "File" menu shown in FIG. 5 at the beginning of editing the control algorithm.

At step 19, a control algorithm in the form of a block diagram is built by using the function block diagram editor of the present invention. An editing process will be illustrated with reference to a user interface screen of the function block diagram editor shown in FIG. 5. Reference numeral 50 indicates a filename of the control algorithm which is being edited, and reference numeral 40 represents a main menu of the function block diagram editor. Below the main menu, various icons are located which represent functions used in the editor. For example, icons 41 and 42 represent connection lines which are used to connect function blocks. Icons 43 and 45 represent basic function blocks and user function blocks, respectively. Icons 44 and 46 represent lists of basic function blocks and user function blocks, respectively. Reference numeral 47 represents a window on which the function block diagram is displayed.

To insert a basic function block to the block diagram shown in the window 47, the user clicks the basic function block icon 43, and then selects a desired function block from the list of icons 44. Then, the selected function block is positioned by clicking a desired position in the window 47. The relationship between function blocks are defined by connection lines 48 and 49 which represent the control signal input and output to and from the function blocks. To connect two function blocks, the user first selects the "connection" menu (not shown) which is a submenu of the "Fbd" menu in the main menu or clicks the connection line icons 41 or 42. Then, the user clicks two function blocks to be connected. The connection line icon 41 may be used for any kind of control signal simply to connect two function blocks, while the connection line icon 42 is used as a logical inverting connection. For example, the connection lines 48 and 49 are formed by using the icons 42 and 41, respectively. To build a connection between two blocks, the user clicks a signal outputting block, which is a function block from which the control signal is output, and subsequently clicks a signal inputting block which is a function block to which the control signal is input. When two or more control signals are input to a function block, each control signal should be handled separately. In the course of connecting function blocks, the type of control signal connected to the function block is checked to match a predetermined type of input/output data to and from the function block, so that wrong connection may not be made. It is preferable to provide the "cut" menu to the function block diagram editor to erase a function block which has been erroneously inserted.

Figure 6:
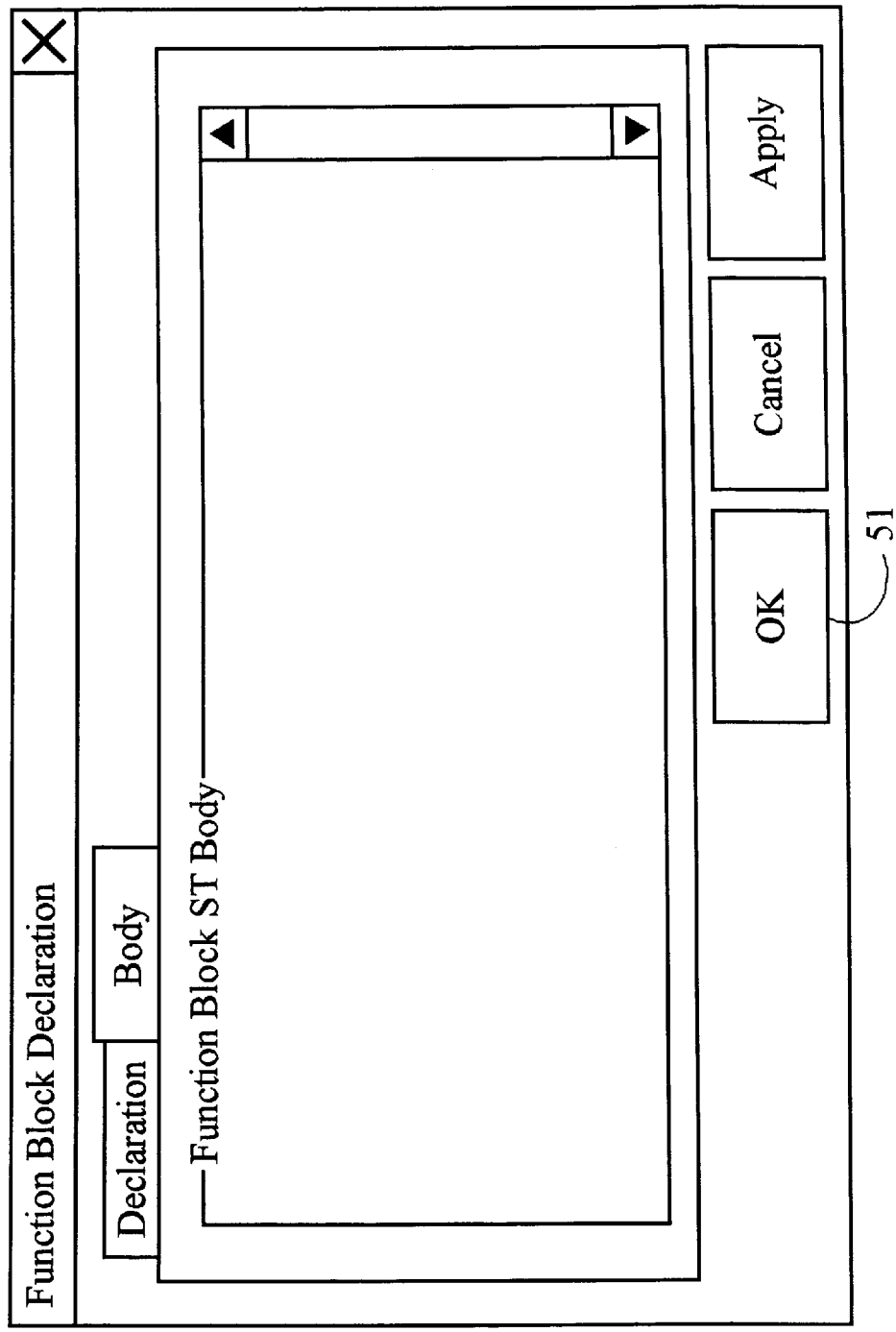
FIG. 6 shows a graphical user interface for defining user function blocks.

Besides predefined basic function blocks, the user can also define and use user function blocks. To produce a user function block in the course of building a unction block diagram, the user should first click a user function block icon 45. When the user function block icon 45 is clicked, the user interface as the one shown in FIG. 6 is displayed on the monitor 2 of the system computer 1. To define the user function block, the user should first input the name of the function block and data types of the input/output nodes. In one embodiment, the name of the user function block including as many as 12 alphanumeric characters can be selected by the user. Then, the contents of the block is written in the form of textual code. Upon completion, the user clicks the "O.K" button 51 so that the function block can be stored in a region in the hard disk 4 which is assigned to the user function blocks. Once completed, the user function block is registered to be used in building the function block diagram of the control algorithm.

Figure 9A:
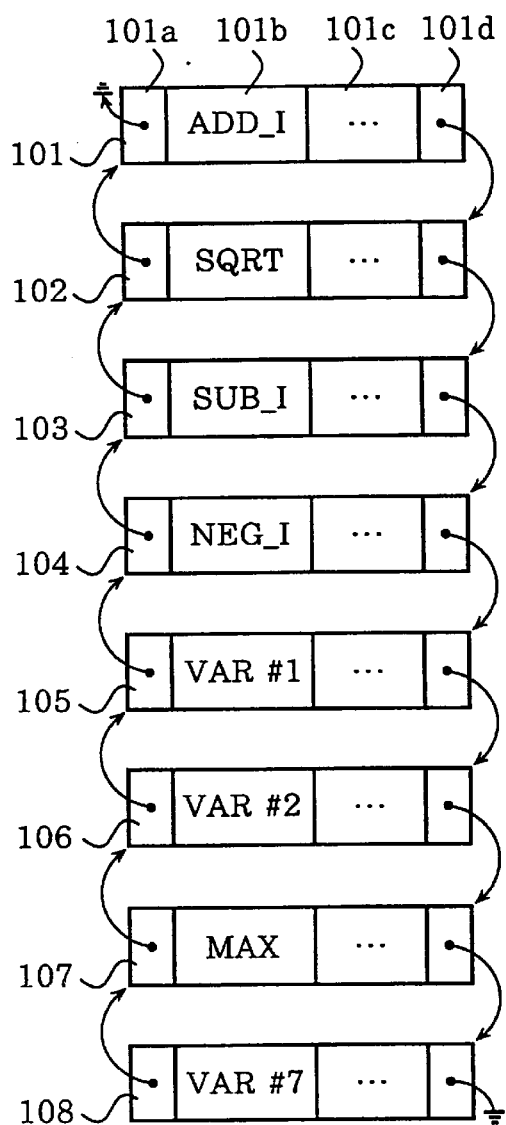
Figure 9B:
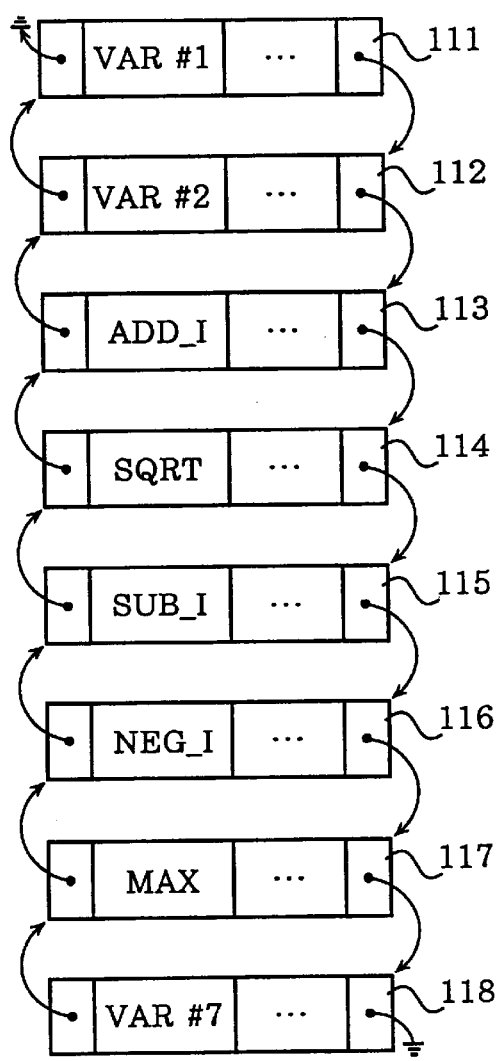
FIG. 9b shows a block diagram list of structured control codes which correspond to the directed graph shown in FIG. 7d.

Referring back to FIG. 2, remaining steps for producing structured control codes will be explained. Upon selecting the "code generation" menu included in the main menu shown in FIG. 5, the control algorithm in the form of a function block diagram is converted to structured control codes at step 20. The actual conversion process includes arranging an original block diagram list (a first list) corresponding to a function block diagram edited according to the order of execution to thereby provide a block diagram list (a second list) corresponding to structured control codes. In FIGS. 9a and 9b, an example of the block diagram list is illustrated as a data structure consisting of a plurality of function block records 101–108, and 111–118 each of which includes a pointer to the previous function block record 101a, a pointer to the next function block record 101d, the name of the function block 101b, and information about the function block 101c, e.g., the numbers of inputs and outputs, and types of each input and output.

Figure 7A:
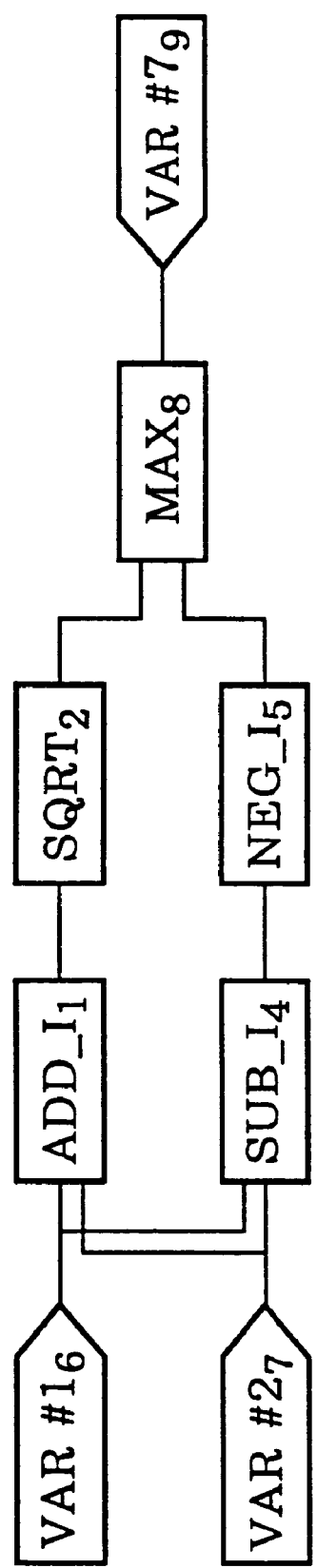
FIG. 7a shows an exemplary control algorithm in the form of a function block diagram.
Figure 7B:
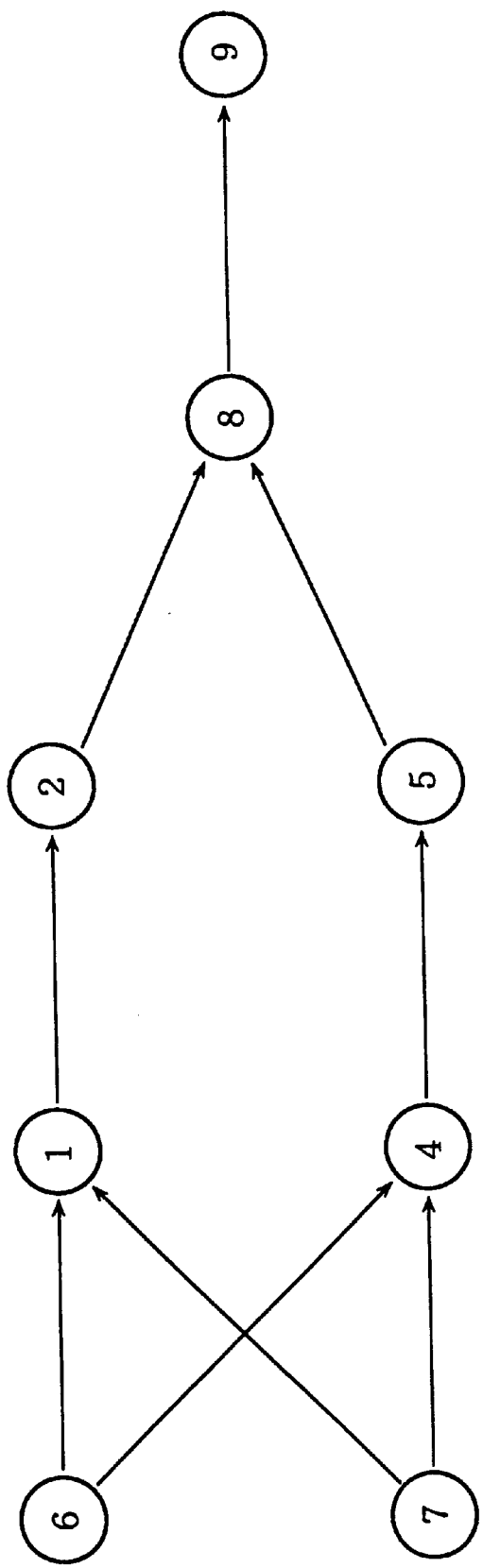
Figure 7C:
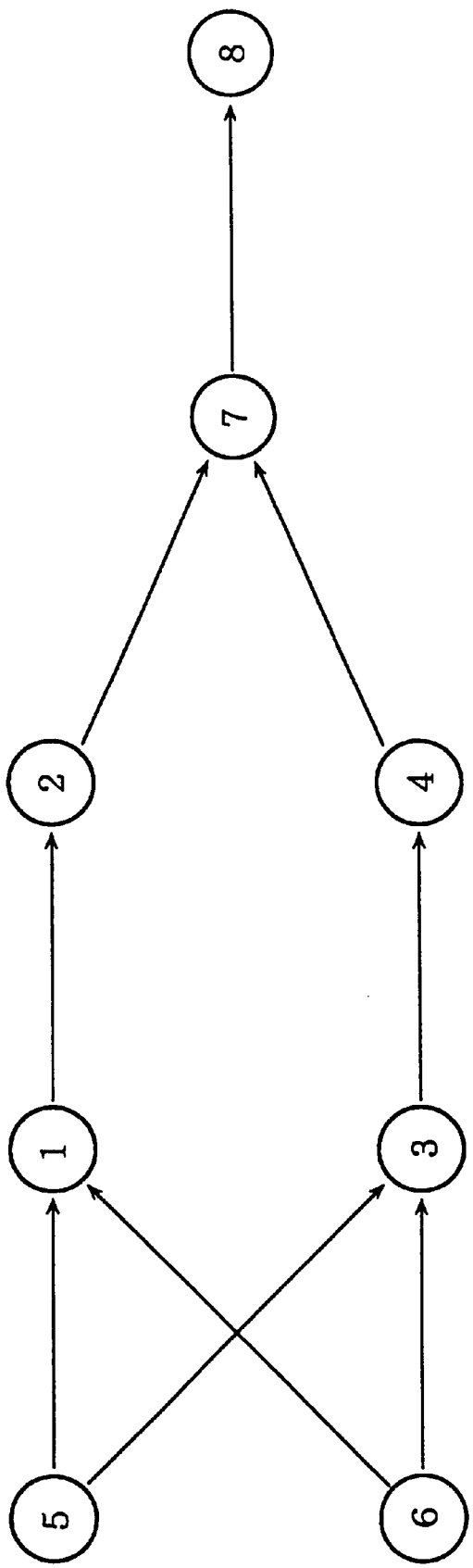
Figure 7D:
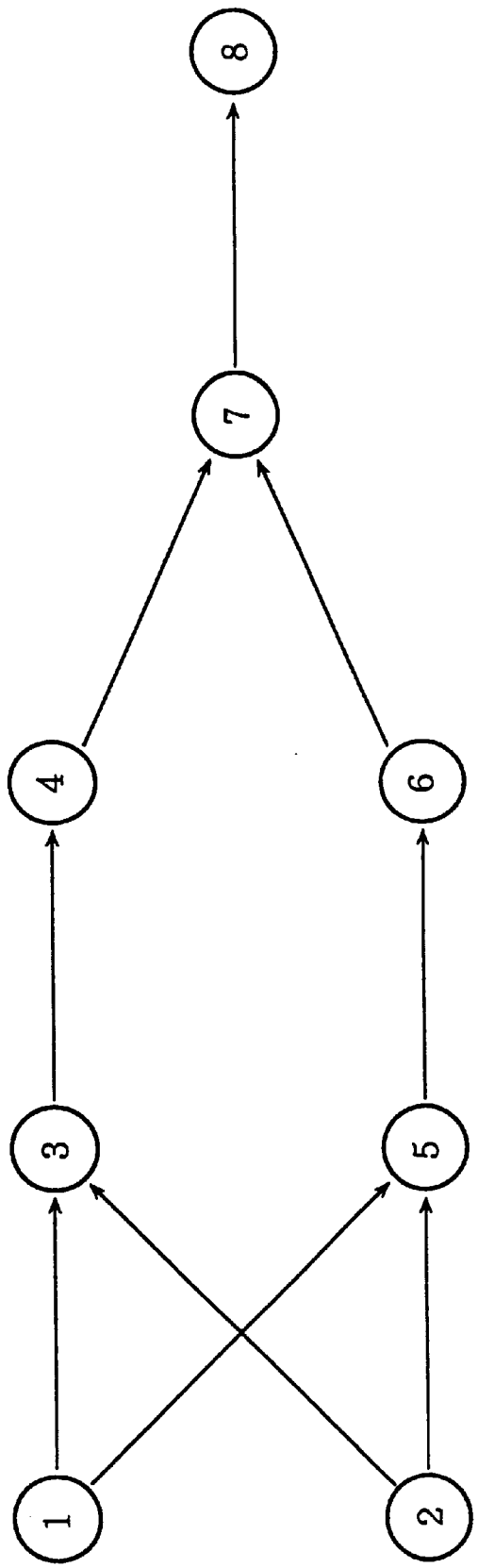

When building the function block diagram, an identification number is allocated to identify a function block which has been inserted. Since the function blocks may be inserted and deleted freely while building the function block diagram, the identification numbers of the function blocks forming the block diagram list may be out of order as shown in FIG. 7a, wherein the numbers identified in each block represent the block identification number. The first block diagram list shown in FIG. 9a is configured in the order of the identification numbers shown in FIG. 7a. To convert the first block diagram list to an executable form, the identification numbers should be reallocated in the order of actual execution. That is, the block diagram list should be rearranged in the order of execution. This procedure may be explained with directed graphs shown in FIGS. 7b to 7d wherein a node represents a function block, and an edge represents a connection between blocks. In the directed graph shown in FIG. 7b, the numbers inside the nodes represent block identification numbers of the function block diagram shown in FIG. 7a as built by a user. The identification numbers in FIG. 7b conforms to the order in which the function blocks have been inserted. In FIG. 7d, there is shown the arrangement of block identification numbers after the conversion. As can be seen, they conform to an order of execution of structured control codes.

The conversion process of step 20 will now be explained in detail with reference to FIG. 3. At step 21, all function blocks in the function block diagram are renumbered so that the identification numbers may be continuous without any vacancy. The identification numbers after the renumbering at step 21 are shown in FIG. 7c. In case that a function block has N outputs, N being more than one, N consecutive numbers are allocated to the function blocks. That is, the function block is treated as if it includes N blocks.

Figure 3:
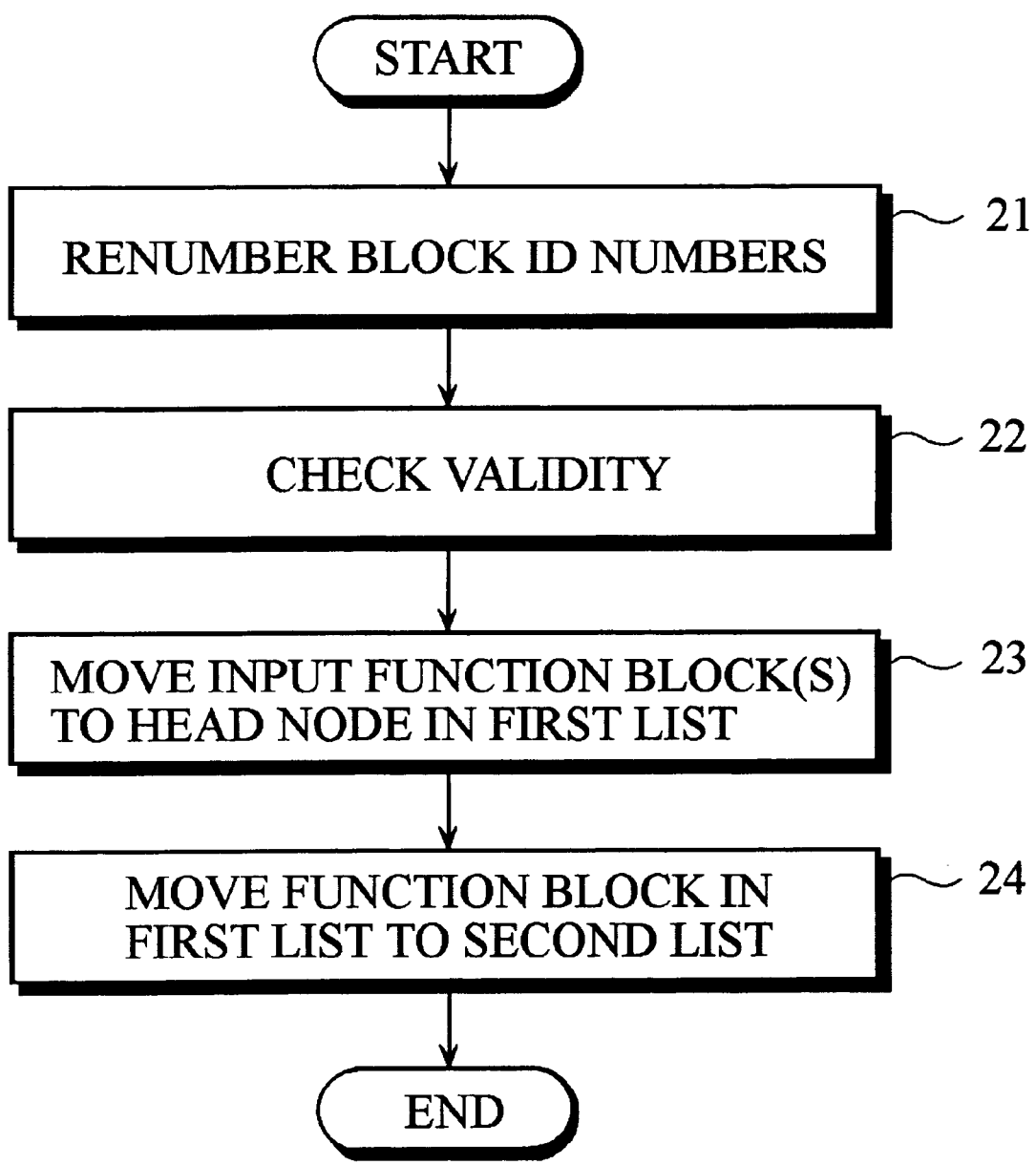
FIG. 3 shows a detailed flow chart of converting step 20 as shown in FIG. 2.

At step 22 in FIG. 3, it is checked whether predetermined requirements, e.g., the number and data types of inputs and outputs of each function block are met. For this purpose, the numbers and data types of inputs and outputs of each basic function block are predetermined and stored as a library. While building the block diagram at step 19, it is not checked whether the block diagram is executable. Instead, the validity of the function block diagram is checked at step 22.

If it is found that the requirements are properly met, then the process moves to steps 23 and 24, wherein the blocks in the first block diagram list are actually arranged, to thereby provide the second block diagram list. At step 23, input function blocks are moved to the beginning of the first block diagram list. A function block can be executed only after input signals are provided. In other words, a function block can be executed only after function block(s) which provides input signals to the function block has been executed. Since the input function blocks have no input, they should be located at the beginning of the list so that they may be executed first. In the example shown in FIGS. 7a to 10c, VAR#1 and VAR#2 are such input blocks.

Figure 10A:
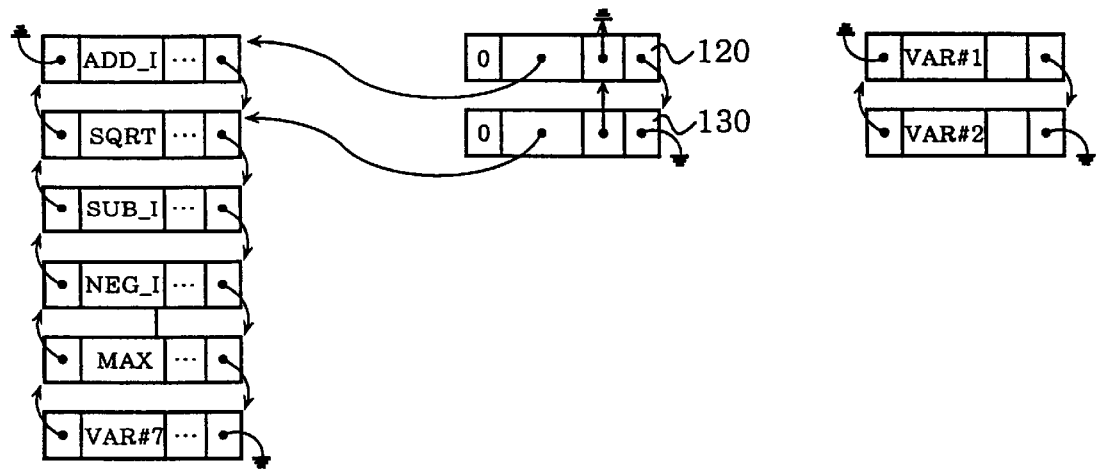
FIGS. 10a to 10c shows a procedure for converting the block diagram list shown in FIG. 9a to the list shown in FIG. 9b.
Figure 10B:
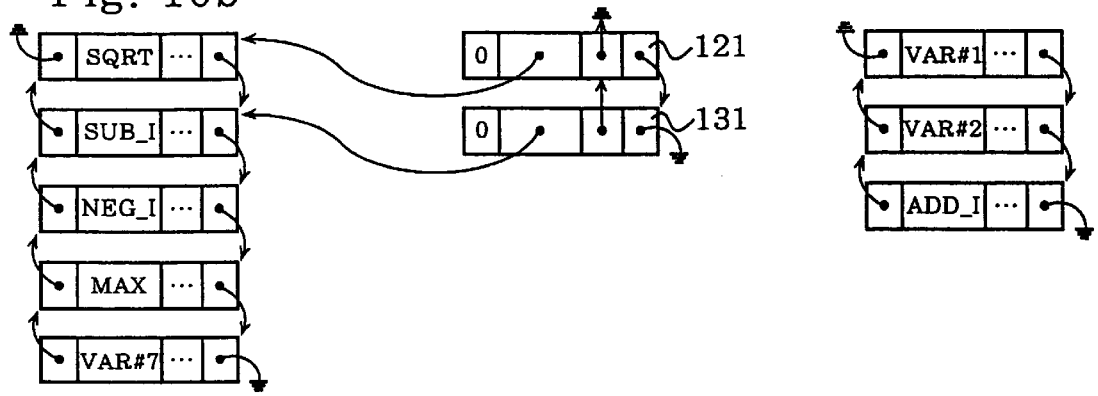
Figure 10C:
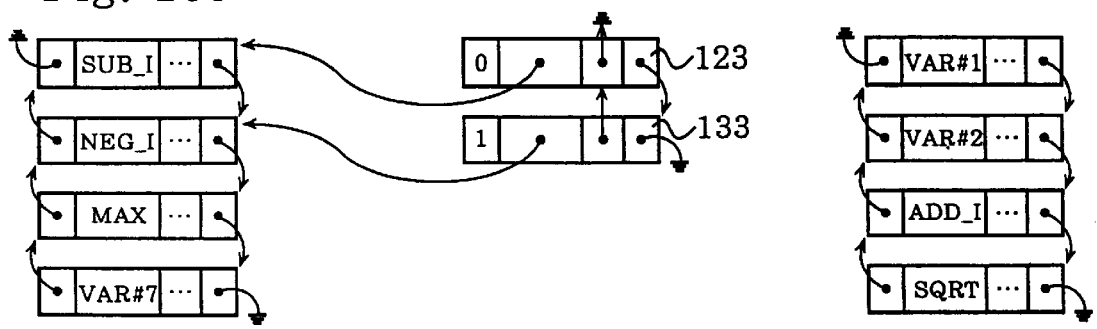

At step 24, function blocks are moved from the first list to the second list one by one as will be explained in detail with reference to FIGS. 4, and 10a to 10c. In FIGS. 10a to 10c, the leftmost column represents the first block list, the rightmost column represents the second block list and the middle column represents a stack used for converting the first list to the second list.

As shown in FIG. 10a, VAR#1 and VAR#2 are first deleted from the first list and inserted into the second list. Then, each of the remaining function blocks included in the first block list is sequentially checked whether all of their inputs are provided (or if all of their signal inputting blocks are moved to the second list). In that case, that function block is deleted from the first list and appended to the second list. As shown in FIG. 7a, the block ADD_I can be executed after VAR#1 and VAR#2. Therefore, it is deleted from the first list and appended as the next block of VAR#2 to the second list as shown in FIG. 10b. In this manner, each block record is deleted from the first list and appended to the last block of the second list one by one until no block record is left in the first list or the stack is null. After all the blocks are appended to the second list, the order of blocks in the second list (shown in FIG. 9b) corresponds to the identification number shown in 7d.

Figure 4:
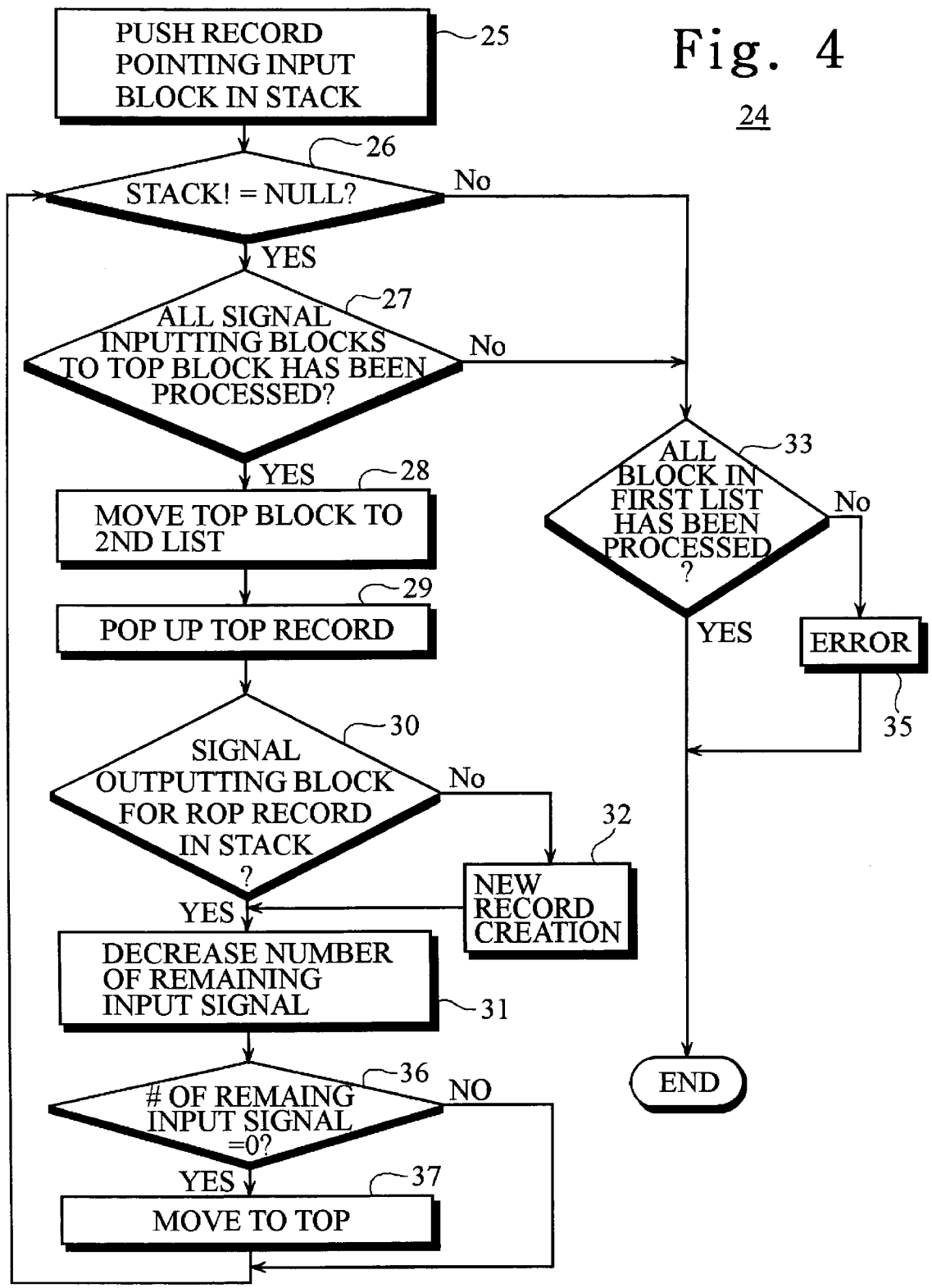
FIG. 4 shows a more detailed flow chart of the rearranging step 24 as shown in FIG. 3.
Figure 8:
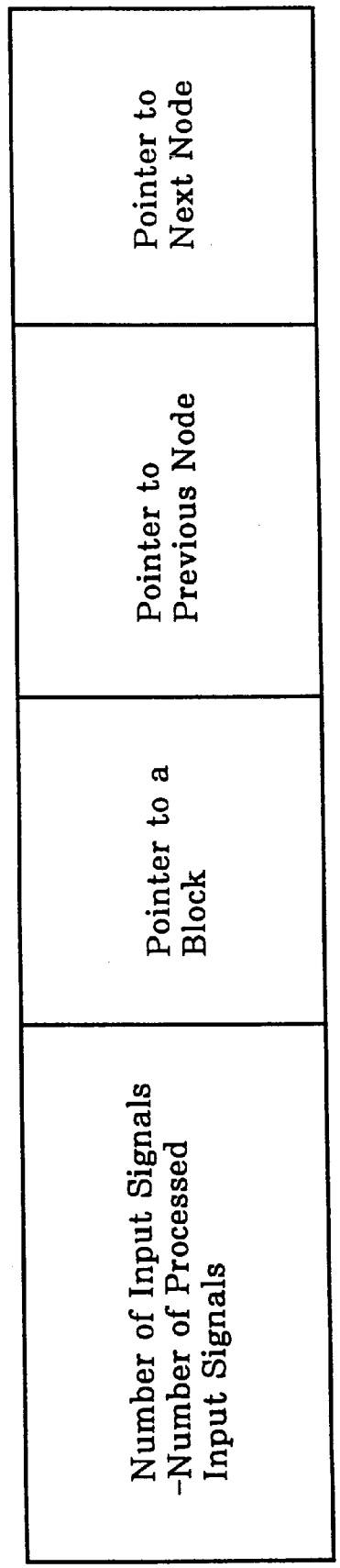
FIG. 8 shows a data structure of a stack used for converting a process control algorithm to structured control codes.

Prior to describing the detailed procedure for moving blocks from the first list to the second list shown in FIG. 4, a structured data record shown in FIG. 8 is explained. A stack including a plurality of such data records is formed during the converting process, wherein each data record points to a block included in the first list. As shown in FIG. 8, each record consists of 4 fields which include the number of remaining input signals, a pointer to a function block in the first list, a pointer to the previous record in the stack, a pointer to the next record in the stack. The number of remaining input signals for a function block equals the number of input signals subtracted by the number of processed input signals. Referring back to FIG. 4, the process for moving blocks (step 24 in FIG. 3) starts at step 25 where data records pointing to input function blocks are created and pushed to the top of the stack. The number of remaining input signals for the input function blocks is 0.

If the stack is not null (step 26), the process proceeds to step 27. At step 27, the top block to which the top record of the stack points is checked to determine whether all inputs thereto have been provided. Step 27 is performed by checking whether the number of remaining input signals in the top record of the stack is 0. If it is found that all signal inputting blocks to the top block have been processed, i.e., inputs of the top block are provided, the process proceeds to step 28, where the top block is moved from the first list to the second list. At step 29, the top record of the stack is popped up. At step 30, it is checked whether a signal outputting block, if any, of the moved top block is pointed to by any of the block records in the stack. If the answer is "no" at step 30, a new data record pointing to the signal outputting block is created and appended to the bottom of the stack. Then, at step 31, the number of remaining input signals in the record pointing to the signal outputting block is decreased by one at step 31. At steps 36 and 37, if the number of remaining input signals is 0, the record is moved to the top of the stack. The above procedure is repeated until the stack is null (step 26).

In FIGS. 10a to 10c, a stack including top records 120 to 123 and bottom records 130 to 133 is shown. As the first field of the top record 120 is 0 in FIG. 10a, ADD_I which is pointed to by the top record 120 is moved from the first list to the second list as shown in FIG. 10b.

As can be seen from FIGS. 10a to 10c, the second list is not created independently but constructed by adjusting pointers to blocks in the first list. Therefore, no additional memory space is needed except for pointers to the first and last blocks in the second list.

When all the blocks in the first list are moved to the second list, the second list is completed, with the blocks therein are listed in the order of execution. If the process ends up at step 35, it means that the block diagram was created an inexecutable form. At step 35, an error block, i.e., the block which cannot be executed, is notified to the user so that the function block diagram can be modified by the user to an executable form.

After completion, structured control codes represented as the second list are stored in the hard disk 4. The control algorithm edited at step 19 of FIG. 2 is also stored in the hard disk. The stored control algorithm can be retrieved to the function diagram editor and modified therein to provide a new control algorithm for a similar control system.

Although the function block diagram editor is used to provide the control algorithm in the present invention, it is apparent that a textual editor can also be used therefor.

According to the present invention, a control algorithm can be easily edited by a novice user using the user interface of a function block diagram editor. Similarly, a conversion to structured control codes can also be performed automatically by clicking on the "CodeGenerate" menu shown in FIG. 5. Therefore, unlike other computer languages, vast knowledge on the language and a compiler thereof is not necessary to generate such code.

While the present invention has been described with respect to the particular embodiments, it will be apparent to those skilled in the art that various changes and modifications may be made without departing from the spirit and scope of the invention as defined in the following claims.

What is claimed is:

1. A method for use in a process control system for generating structured control codes which control a subject system, said process control system having a user interface of a function block diagram editor including basic function block menus which represents a plurality of predetermined basic function blocks, said method comprising the steps of:

providing input/output data of the subject system in the form of a database;

retrieving the input/output data of the subject system;

providing the input/output data as an input/output block menu on the user interface of the function block diagram editor;

building a control algorithm in block diagram form by using the input/output block menus and the basic function block menus on the user interface; and converting the control algorithm to structured control codes, wherein the basic function block includes an arithmetic function block, a trigonometric function block, a combination function block, a comparison function block, a bit-shift function block, a selection function block, and a variable type conversion function block.

2. A method for use in a process control system for generating structured control codes which control a subject system, said process control system having a user interface of a function block diagram editor including basic function block menus which represents a plurality of predetermined basic function blocks, said method comprising the steps of:

providing input/output data of the subject system in the form of a database;

retrieving the input/output data of the subject system;

providing the input/output data as an input/output block menu on the user interface of the function block diagram editor;

building a control algorithm in block diagram form by using the input/output block menus and the basic function block menus on the user interface;

converting the control algorithm to structured control codes;

generating a user function block; and adding the user function block to the basic function blocks.

3. A method for use in a process control system for generating structured control codes which control a subject system, said process control system having a user interface of a function block diagram editor including basic function block menus which represents a plurality of predetermined basic function blocks, said method comprising the steps of:

providing input/output data of the subject system in the form of a database;

retrieving the input/output data of the subject system;

providing the input/output data as an input/output block menu on the user interface of the function block diagram editor;

building a control algorithm in block diagram form by using the input/output block menus and the basic function block menus on the user interface; and converting the control algorithm to structured control codes, wherein said building step includes:

selecting one of the basic function blocks and the input/output blocks;

positioning the selected block on the user interface;

connecting two blocks on the user interface; and removing an unnecessary block from the user interface, wherein the control algorithm is provided as a first list of blocks each having an identification number identifying an order in which the block is selected and positioned on the user interface.

4. The method of claim 3, wherein said converting step includes:

rearranging blocks included in the first list according to the order of execution, to thereby provide structured control codes.

5. The method of claim 4, wherein said rearranging step includes:

removing a block included in the first list; and appending the removed block to a second list which represents structured control codes.

\* \* \* \* \*